W. S. ADAMS.
CAR TRUCK.
APPLICATION FILED JUNE 18, 1915.

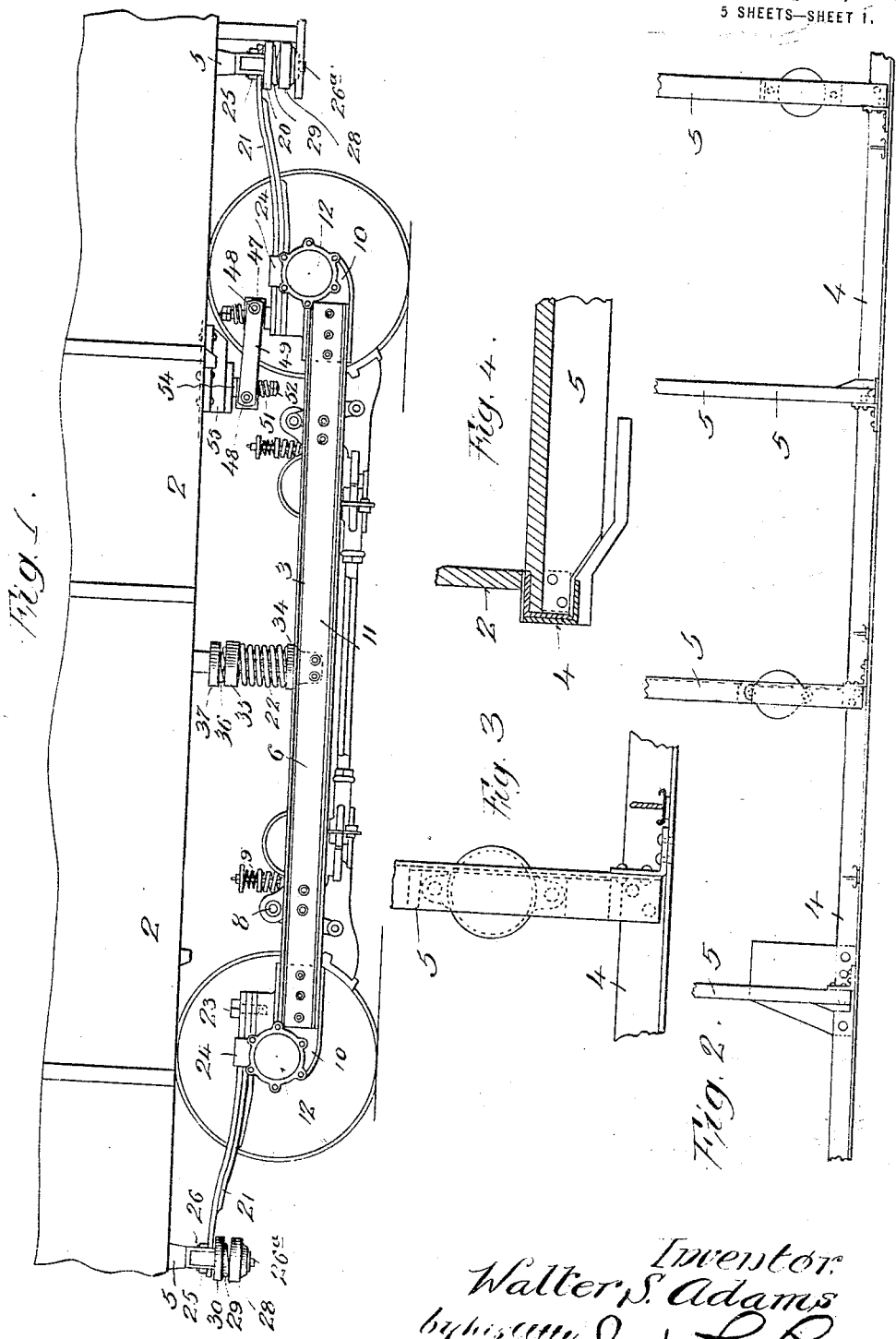

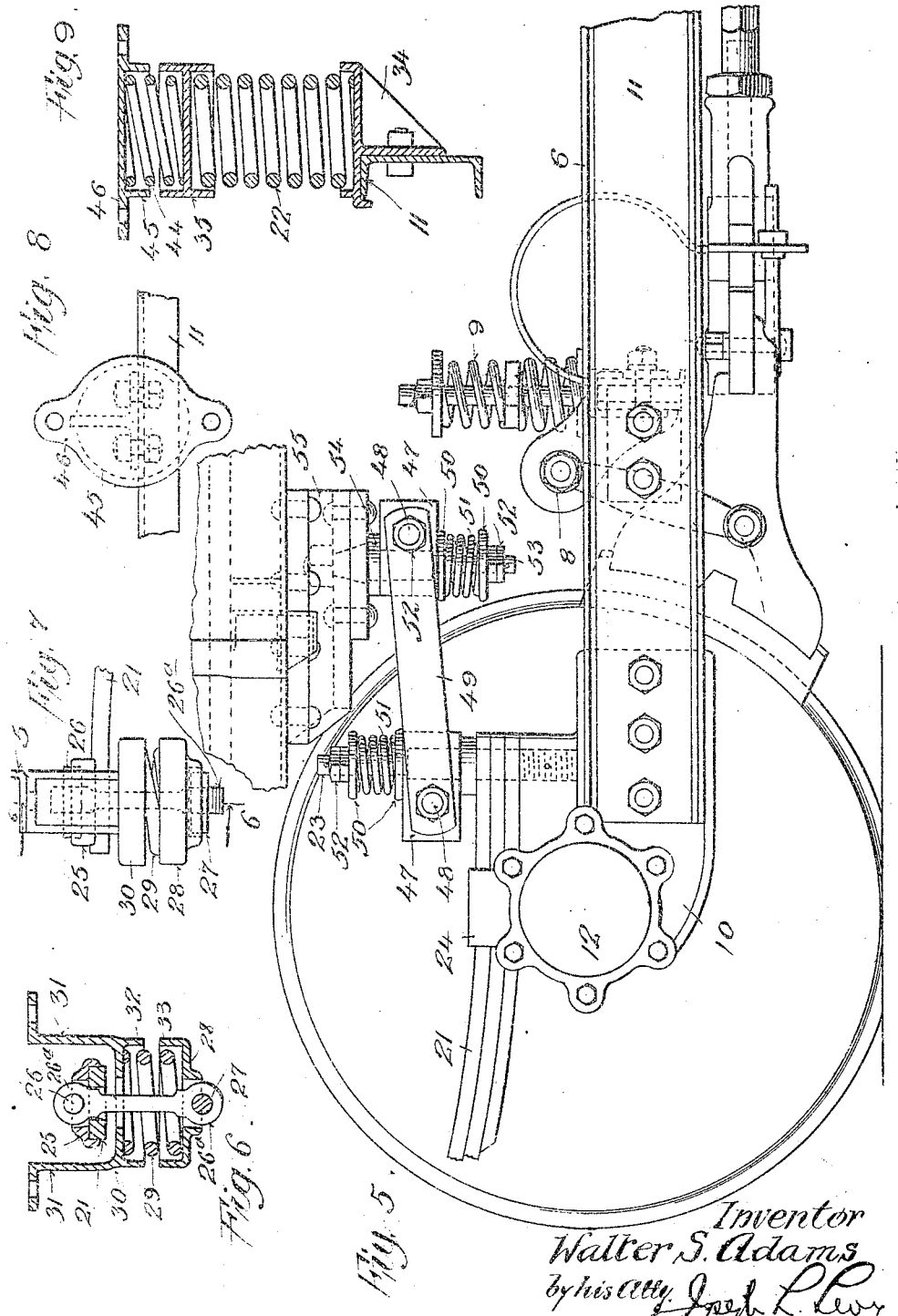

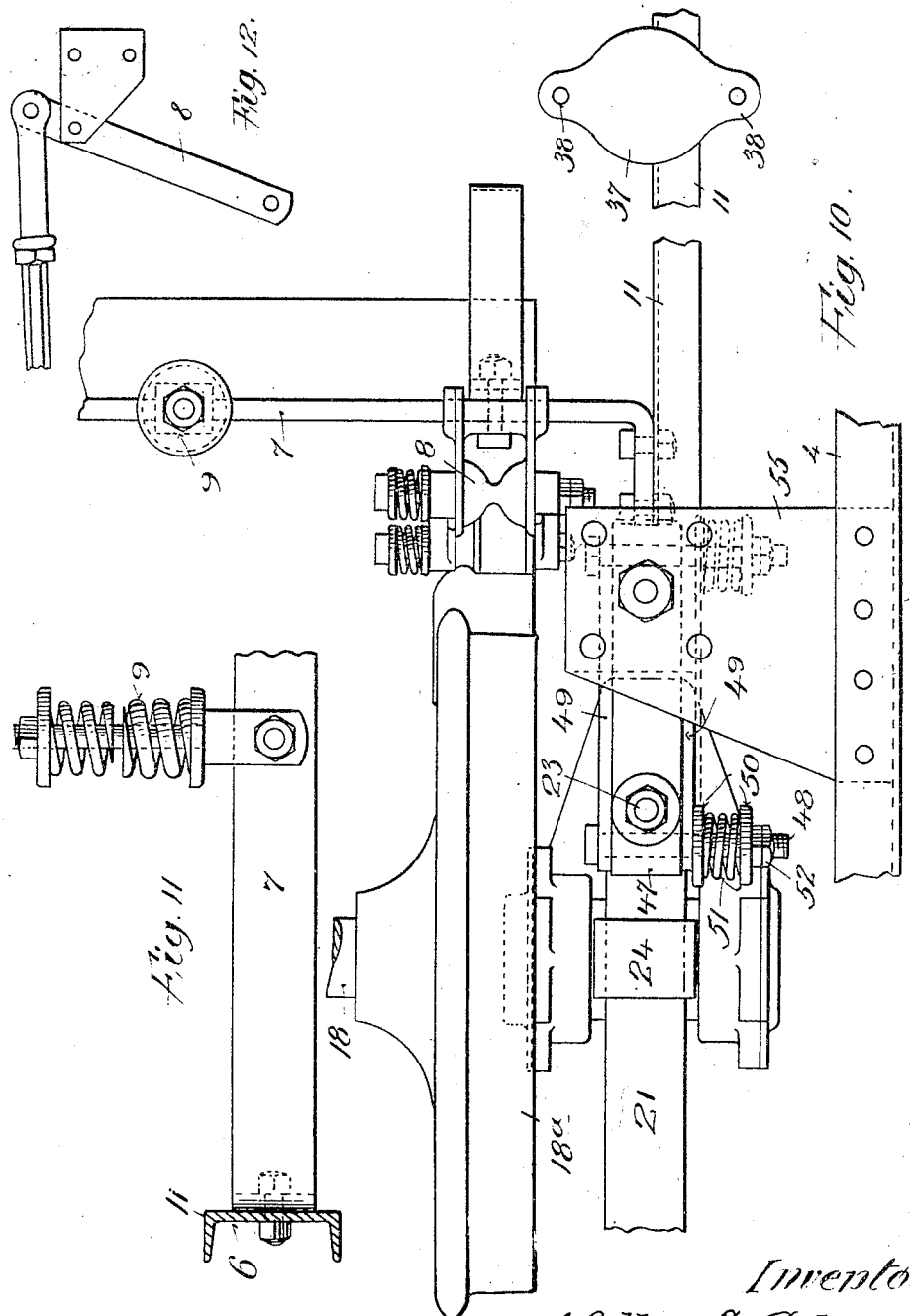

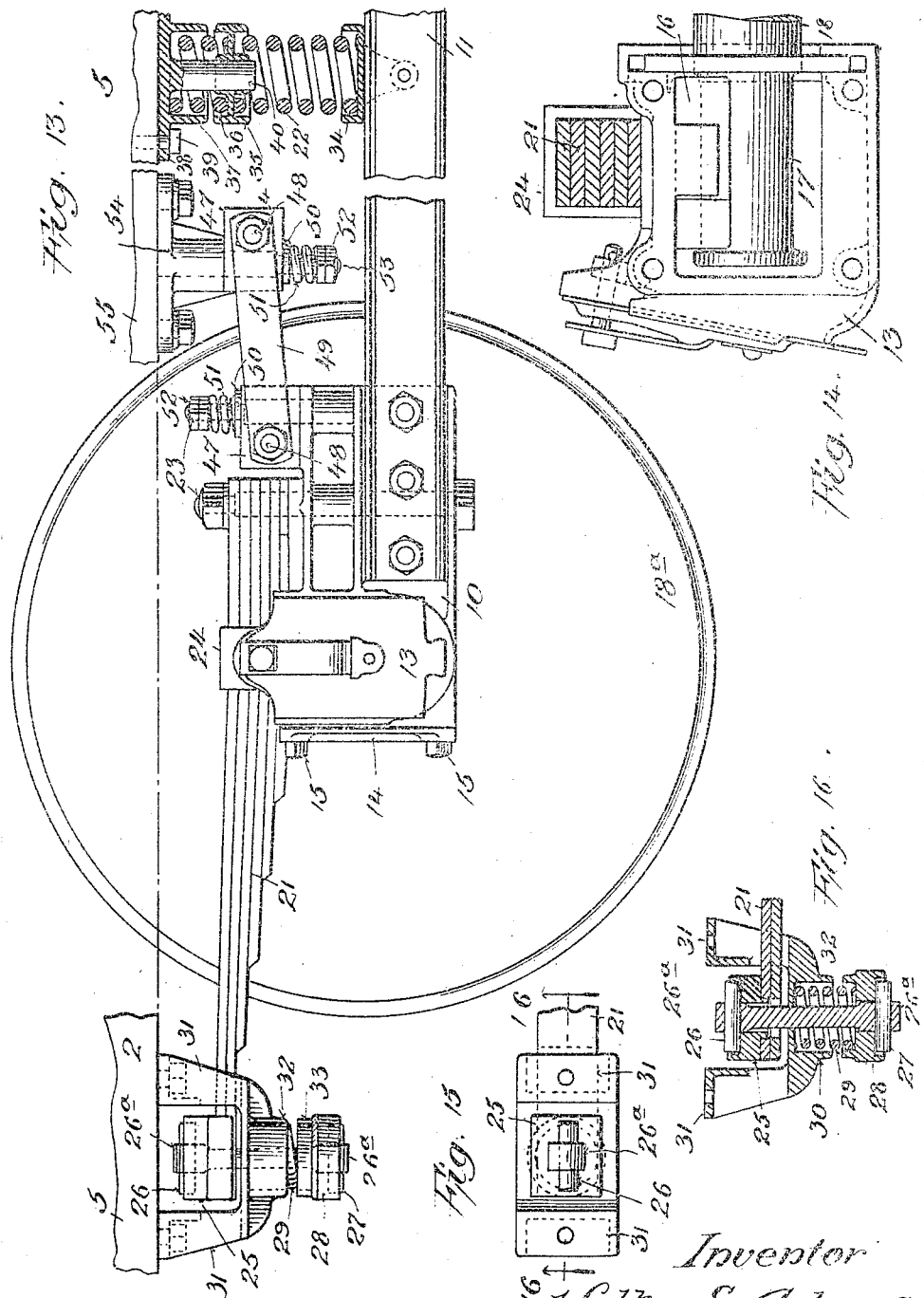

1,177,914.

Patented Apr. 4, 1916.
5 SHEETS—SHEET 5.

Inventor
Walter S. Adams
by his Atty. Joseph L. Levy

UNITED STATES PATENT OFFICE.

WALTER S. ADAMS, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

CAR-TRUCK.

1,177,914.  Specification of Letters Patent.  Patented Apr. 4, 1916.

Application filed June 18, 1915. Serial No. 34,842.

*To all whom it may concern:*

Be it known that I, WALTER S. ADAMS, a citizen of the United States, and a resident of the city and county of Philadelphia and State of Pennsylvania, have invented a new and useful Improvement in Car-Trucks, of which the following is a specification.

The object of my invention is to provide a suitable truck which will be light, durable and easy riding and in every way suitable for light cars. These, and other objects are accomplished by my invention, some embodiments of which are hereinafter set forth.

For a more particular description of my invention, reference is to be had to the accompanying drawings, forming a part hereof, in which—

Figure 17:
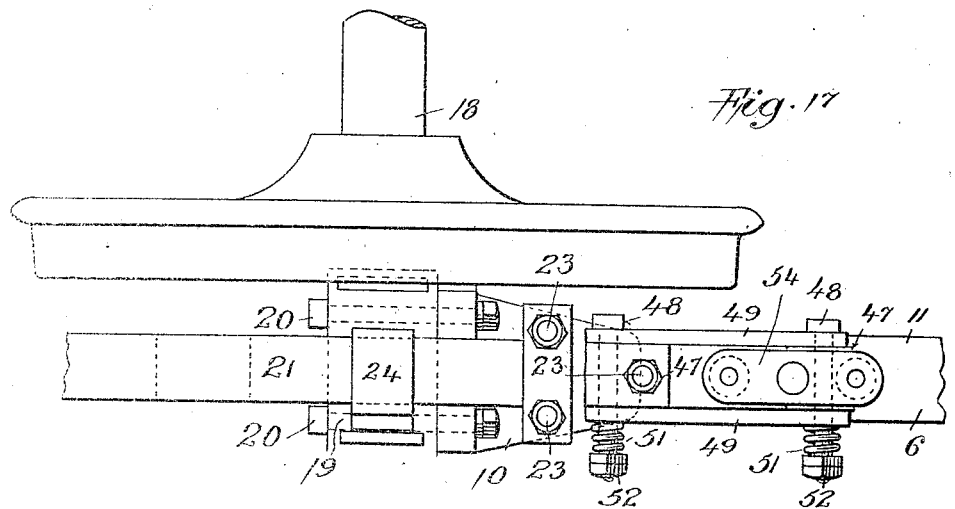
Figure 18:
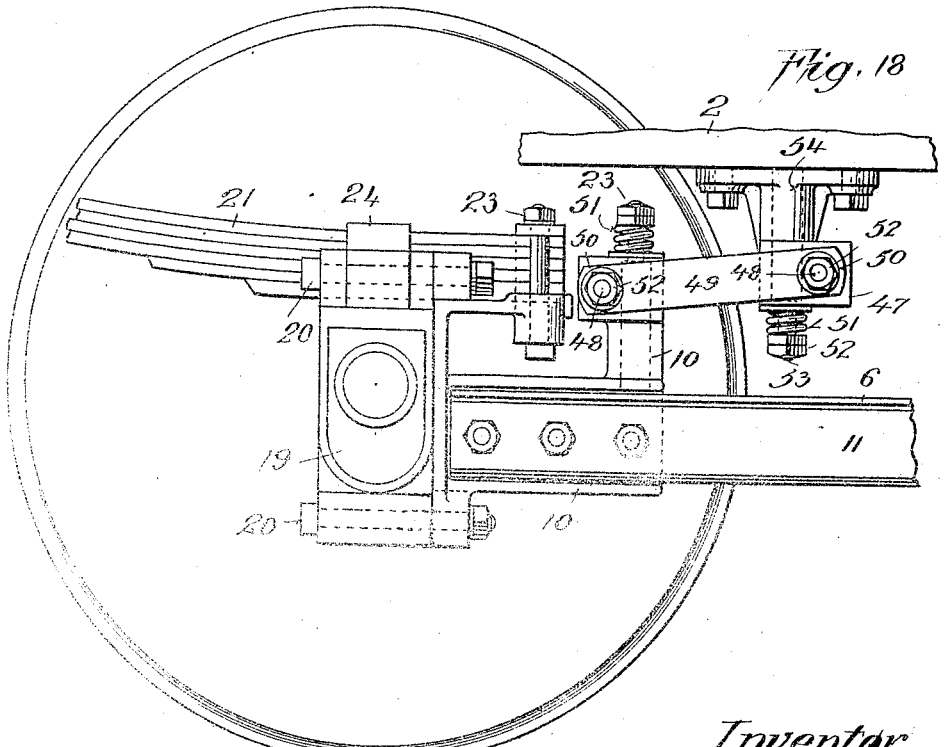

Figure 1 is a side elevation of my improved truck on which a car is mounted, only a portion of the car being shown; Fig. 2 is a plan view of the frame of the car body showing where the truck is connected; Figs. 3 and 4 are detailed views showing portions of the frame and floor of the car, the frame being a horizontal section and the latter a vertical section; Fig. 5 is a side elevation, somewhat enlarged, of one end of my improved truck and a portion of a car body to which it is connected; Figs. 6 and 7 show details relating to the spring mechanism whereby the quarter elliptic springs are connected to the car body, Fig. 6 being a sectional view taken on the line 6—6 of Fig. 7, looking in the direction of the arrows; Figs. 8 and 9 show the coil springs mounted near the center of the truck and the seats for the same; Fig. 10 is a plan view of the structure shown in Fig. 5; Fig. 11 shows a portion of the mechanism for supporting the free end of a motor; Fig. 12 shows a part of the brake mechanism; Fig. 13 shows a modified structure in which bearings are used with special provision for the removal of the wheels; Fig. 14 is an end view of an axle box and connected parts with an end cover removed; Fig. 15 is a plan view of the outer end of a quarter elliptical spring and the shackle and bracket connected therewith; Fig. 16 is a sectional view, taken on the line 16—16 of Fig. 15, looking in the direction of the arrows; and Figs. 17 and 18 are further modifications showing a structure in which the axle boxes, as well as the wheels and axles, may be readily removed from the frame of the truck.

Throughout the various views of the drawings, similar reference characters designate similar parts.

A car 1 is provided with a suitable body 2 and truck 3, the body 2 being provided with suitable longitudinal sills 4 and crossings 5, together with the necessary angle plates and rivets for holding the parts together. The exact construction of the car body is not essential, but the preferred embodiment is the one shown.

It is desirable that the car body be rigid and light so as to coöperate properly with the truck which carries it.

The truck 3 has side frames 6 connected by suitable crossings 7 on which the brake rigging 8 and the motor supports 9 are carried in the conventional way.

Secured to each end of the side frame 6 are suitable brackets 10 connected by a suitable channel bar 11, the brackets and channel bar constituting the side frame 6. In the structure shown in Figs. 1 and 5, inclusive, each bracket 10 carries an axle box 12 suitable for roller bearings. In the structure shown in Figs. 13 and 14, the bracket 10 is made integral with an axle box 13 which has a cover 14 secured thereto at its end by bolts 15, so that by removing the bolts, the wheels and axle 18 may be removed. In the structure shown in Figs. 17 and 18 the axle box 19 is secured by bolts 20 to the bracket 10. In any event the axle box is firmly secured in the bracket.

The car body 2 is carried from the truck 3 by means of suitable quarter elliptic springs 21 and coil springs 22, the quarter elliptic springs being secured over the axle boxes, and the coil springs 22 on the side bars 11 and under suitable crossings 5 of the car frame.

Each spring 21 is secured to a bracket 10 by means of a bolt 23, or several such bolts, and it is secured in such a way that its band 24 rests in a suitable seat on or over the axle boxes. The free end of each spring 21 carries a suitable bearing 25 in which rests a pivot pin 26 which extends longitudinally of the spring, which pin carries a hanger 26ª which passes through a perforation in the cup 25 and spring 21 and supports near its lower end a second pin 27 which is parallel with the pin 26, and this pin 27 supports a suitable spring seat 28 for a coil spring 29, and the coil spring 29 carries a cap 30 which is surmounted by the arms 31 which are adapted to be secured to a crossing 5 of the car body. The lower edges 32 of the caps 30 and the upper edges 33 of the seats 28 are adapted to come together whenever the spring 29 is sufficiently compressed and before the spring 21 is carrying its maximum load.

The springs 22 which are over and carried from the bar 11 are seated on suitable brackets 34, and each of these springs 22 is surmounted by a cap 35 which is also a cup to receive a second coil spring 36. These springs 36 are surmounted by a second cap 37 that is secured to a crossing 5 of the car body 2, in any suitable manner, as by ears 38 and bolts 39. These caps 37 may carry a suitable downwardly extending guide pin 40 which runs through a suitable bearing in the cap 35 so as to keep the springs 22 and 36 in proper alinement, as shown in Fig. 13, or the guide pin may be omitted as shown in Fig. 3. Each spring 36 is weakened so as to be resilient only when light loads are used. When the car is loaded sufficiently the spring 36 is so compressed that the seat 37 and cap 45 come together so that this spring 36 is inoperative for cushioning purposes, and the spring 22, together with the other coil springs 22 and the quarter elliptic springs 21 carry the load.

To prevent the truck from getting out of true without increasing the weight of the car and truck to any material extent, and to utilize the rigidity of the frame of the car whereby all diagonal bracing of the truck is eliminated, in the preferred embodiment of my invention I provide suitable links which connect the car body and frame, one on each side at diagonally opposite corners. On suitable bolts 23, or other bolts, as may be desired, are mounted suitable blocks 47, one on each bolt, each block being provided with a suitable vertical hole for the bolt 23, and a second horizontal hole for the bolt 48 that carries the links 49, one on each side of the block 47. The block 47 is free to turn on the bolt 23 and is kept from turning too freely by means of the washers 50 and the coil spring 51 which is sandwiched between them and kept under compression by the lock nuts 52 of the bolt 23. The other ends of the links 49 are connected by a corresponding bolt 48 which passes through a second block 47 on a depending bolt 53 which carries lock nuts 52, washers 50 and coil spring 51 which forces the block 47 against a proper seat 54 mounted on a suitable bracket 55 that is secured to a car sill 4 and crossing 5, in any suitable way. The bolts 48 are also provided with nuts 52, washers 50 and springs 51. The links 49, blocks 47, and the springs 51 prevent excessive side-swing because of the friction of the parts 49 and 47 due to the springs 51, and at the same time sufficient play is permitted to let the car body ride easily on the truck at all times and especially on curves.

The brake rigging 8 and motor supports 9 may be carried in any suitable way, and made in any suitable form, but are preferably so made and carried that space is left for storage batteries or other devices, as desired.

In view of the foregoing the operation and use of my improved truck will be readily understood.

When the load is light, the coil springs 29 and 36 will make it easy riding and when the load is heavy, the stiffer springs will take care of this load so as to still keep this truck an easy riding one. Moreover, the load is distributed so that the quarter elliptic springs 21 carry about three-quarters of the load at their ends, the other quarter being taken by the coil springs over the bar 11.

The rigidity of the frame of the car body coöperates through the links 49 and the connected parts so as to make the frames 6 of the truck remain secure and true at all times, and the axle boxes are so made that the axles and wheels may be readily removed from the truck, when desired, by disconnecting a few bolts.

Having thus described my invention, what I claim is:

1. A truck having a frame, axle boxes on the ends of said frame, quarter elliptic springs resting on the axle boxes, coil springs on the truck frame intermediate the ends of said frame, supplementary springs on the quarter elliptic springs and coil springs, said supplementary springs being weaker than the quarter elliptic and coil springs, and adapted to cushion light loads.

2. A car truck having a frame with quarter elliptic springs secured to each end, coil springs intermediate of the ends, and links adapted to connect the truck to a car body.

3. A truck having a side frame with axle boxes on the ends of said frame, quarter elliptic springs at the ends of said frame and resting on the axle boxes and supplemental coil springs carried by the quarter elliptic springs adapted to take the stress of light loads whereby the truck will be easy riding with light loads.

4. In a truck, side frames, quarter elliptic springs secured thereto at each end, seats mounted on said springs, pins mounted in said seats, hangers suspended from said pins, a second set of pins, one at the bottom of each hanger, a spring seat carried on each of said pins, a cap on each of said coil springs and means for connecting said cap with a car body.

5. In a device of the class described, a car body and a car truck, a plurality of links and blocks held together with bolts and springs for uniting the truck and car body and causing frictional resistance to all lateral movements of the car body on the truck.

6. In a device of the class described, a car body and a truck with side frames and springs carried thereby and a plurality of links and blocks held together with bolts and springs for uniting the truck and car body and causing frictional resistance to all lateral movements of the car body on the truck.

7. In a device of the class described, a car body and a truck with side frames and springs carried thereby to support the car body and links with friction causing means uniting the car body and truck.

8. A car truck having side frames, axle boxes secured to the ends of said frames, quarter elliptic springs secured at the ends of said frames above the axle boxes, a spring seat secured to each quarter elliptic spring adjacent its outer or free end, a coil spring mounted on said seat and a cap for said coil spring secured to the car body.

9. A car truck having side frames, brackets on the ends of said side frames, axle boxes secured to said brackets, quarter elliptic springs secured to the ends of the side frames and resting on the axle boxes, hangers suspended from the ends of said quarter elliptic springs, spring seats on said hangers, coil springs resting on said seats and caps resting on said coil springs, said caps being secured to the car body.

10. A car truck having side frames, axle boxes secured to the ends of said side frames, quarter elliptic springs secured at the ends of said side frames and resting on the axle boxes, hangers suspended from the ends of said quarter elliptic springs, spring seats mounted on the lower ends of said hangers, coil springs resting on said spring seats, and caps resting on said coil springs, the upper ends of said caps being secured to the car body.

11. A car truck having a side frame, brackets secured to the ends of said frame, axle boxes secured to said brackets, quarter elliptic springs secured to said side frame adjacent its ends and above the axle boxes, bearings secured to the outer or free ends of said elliptic springs, pins in said bearings, hangers carried on said pins and extending downwardly therefrom, pins in the lower ends of said hangers, spring seats carried on said pins, coil springs carried on said seats, caps carried on said coil springs, said caps being secured to the car body.

12. A car truck having side frames, brackets secured to the ends of said frames, axle boxes secured to said brackets, quarter elliptic springs secured to said brackets above the axle boxes, bearings secured to the outer or free ends of the quarter elliptic springs, hangers mounted in said bearings and extending downward through openings in the ends of the leaf springs and bearings, spring seats mounted on the lower ends of said hangers, coil springs resting on said seats, caps resting on said springs, said caps being secured to the car body.

13. A truck having side frames, axle boxes secured to the ends of said side frames, quarter elliptic springs secured adjacent the ends of said side frames and above the axle boxes, hangers mounted on the ends of the quarter elliptic springs, spring seats on the lower ends of said hangers, coil springs resting on said seats and caps resting on said coil springs and secured to the car body; a bearing mounted on the car body, a bearing mounted on the truck frame; blocks pivotally mounted on said bearings, springs on said bearings exerting a frictional resistance to movement of said blocks and a link extending between said blocks and pivotally secured thereto.

Signed at the city and county of Philadelphia, and State of Pennsylvania, this 18th day of May, 1915.

WALTER S. ADAMS.